US007843545B2

(12) United States Patent
Jung et al.

(10) Patent No.: US 7,843,545 B2
(45) Date of Patent: Nov. 30, 2010

(54) LIQUID CRYSTAL DISPLAY COMPRISING A FIRST DUMMY PATTERN FORMED ALTERNATELY AND APART FROM A SECOND DUMMY PATTERN AND METHOD OF MANUFACTURING THE SAME

(75) Inventors: Sung Su Jung, Paju-si (KR); Young Chan Lee, Daegu-si (KR); Young Il Kim, Gumi-si (KR); Jong Sub Park, Gyeongsangbuk-do (KR)

(73) Assignee: LG. Display Co., Ltd., Seoul (KR)

( * ) Notice: Subject to any disclaimer, the term of this patent is extended or adjusted under 35 U.S.C. 154(b) by 563 days.

(21) Appl. No.: 11/472,022

(22) Filed: Jun. 20, 2006

(65) Prior Publication Data
US 2007/0097306 A1 May 3, 2007

(30) Foreign Application Priority Data
Oct. 28, 2005 (KR) ...................... 10-2005-0102071

(51) Int. Cl.
*G20F 1/1343* (2006.01)
*G20F 1/1345* (2006.01)
*G20F 1/1339* (2006.01)

(52) U.S. Cl. .................. 349/149; 349/139; 349/150; 349/151; 349/152; 349/153; 349/155; 349/157

(58) Field of Classification Search ............... 349/139, 349/149–153, 155, 157
See application file for complete search history.

(56) References Cited

U.S. PATENT DOCUMENTS 5,953,094 A * 9/1999 Matsuoka et al. ........... 349/153
6,392,735 B1 * 5/2002 Tani ............................ 349/156
6,466,294 B1 * 10/2002 Yamagishi et al. .......... 349/155
2003/0179334 A1 * 9/2003 Kang et al. ................. 349/139
2004/0021813 A1 * 2/2004 Kim et al. ................... 349/113
2005/0094081 A1 5/2005 Lee

FOREIGN PATENT DOCUMENTS

CN 1414422 4/2003
KR 10 2004 0083684 10/2004

OTHER PUBLICATIONS

First Office Action for corresponding Chinese Patent Application Serial No. 2006100918979, dated Dec. 7, 2007.

* cited by examiner

*Primary Examiner*—Andrew Schechter
*Assistant Examiner*—Charles Chang
(74) *Attorney, Agent, or Firm*—Brinks Hofer Gilson & Lione (57) ABSTRACT

An LCD and a method of manufacturing the same are provided. The LCD includes first and second substrates defined by a display region and a non-display region, and spaced a predetermined interval apart from each other. The LCD further comprises a liquid crystal layer interposed between the first and second substrates, a conductive part formed on at least one side of the first substrate corresponding to the non-display region. The conductive part has a first dummy pattern formed of metal identical to that of a gate line in the display region. The LCD then comprises a common electrode formed on the second substrate, and a conductive thread pattern that electrically connects the common electrode and the conductive part, and attaches the first and second substrates.

19 Claims, 6 Drawing Sheets

Fig. 6C

LIQUID CRYSTAL DISPLAY COMPRISING A FIRST DUMMY PATTERN FORMED ALTERNATELY AND APART FROM A SECOND DUMMY PATTERN AND METHOD OF MANUFACTURING THE SAME

This application claims the benefit of Korean Patent Application No. 102071/2005 filed in Korea on Oct. 28, 2005, which is hereby incorporated by reference.

FIELD

The present invention relates to a liquid crystal display device, and more particularly, to a liquid crystal display device conducting two substrates using a conductive thread pattern, and a method of manufacturing the same.

BACKGROUND

A liquid crystal display device (LCD) is one example of flat display devices. The LCD displays data through physical optics characteristics. Since the LCD has a lower power consumption compared to other display devices, takes advantages of lightweight and thin properties, and can be manufactured in various sizes, it has been widely used in diverse fields.

The LCD includes a thin film transistor (TFT) array substrate, a color filter array substrate, and a liquid crystal. The color filter array substrate is disposed opposite to the TFT array substrate. The liquid crystal is interposed between the TFT array substrate and the color filter array substrate. The TFT array substrate includes a plurality of signal lines, and a pixel electrode connected to the TFT transistor. Additionally, the color filter array substrate includes a color filter layer for color displaying, and common electrodes.

The common electrode disposed on the color filter array substrate is electrically connected to a conductive part, which is disposed on the outside of the TFT array substrate. A common voltage supplied from an external circuit through the conductive part is supplied to the common electrode.

The common electrode is electrically connected to the conductive part through a silver dot medium. The silver dot is manufactured by coating silver in a paste state through a dispenser, drying the resulted silver dot during a predetermined time, and attaching the two substrates by pressure. At this point, in case the two substrates are attached when a silver paste coated on the TFT is not dried completely, the silver of a low density is formed. Therefore, the area contacting the common electrode is reduced and also an appropriate voltage can not be supplied.

To overcome this problem, there is provided an LCD having the conductive part formed through a conductive ball of a high density without the silver paste.

Figure 1A:
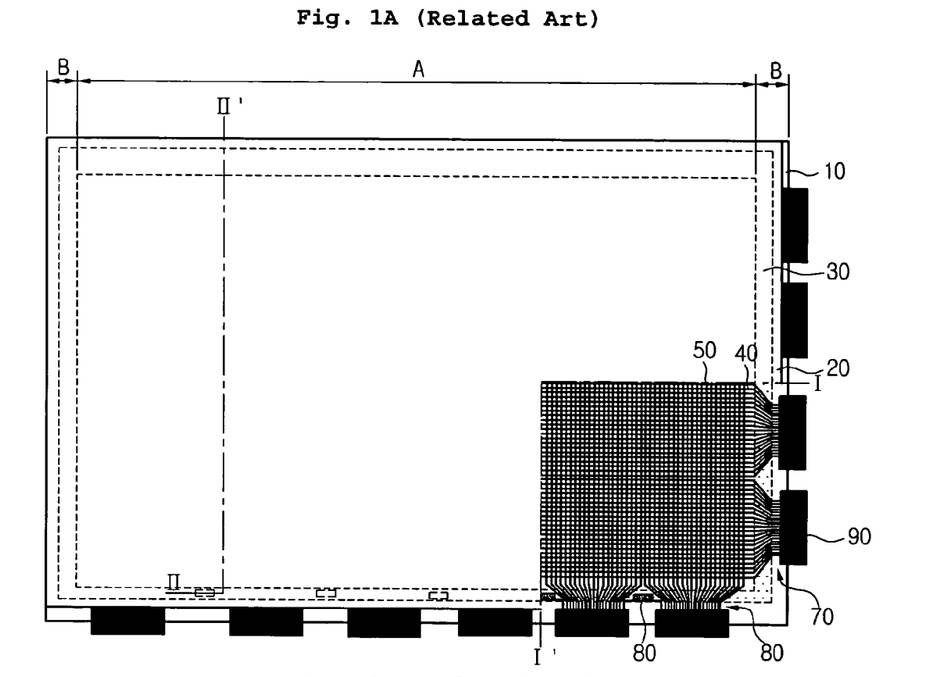
FIGS. 1A and 1B are views of an LCD using a related art conductive thread pattern.
Figure 1B:
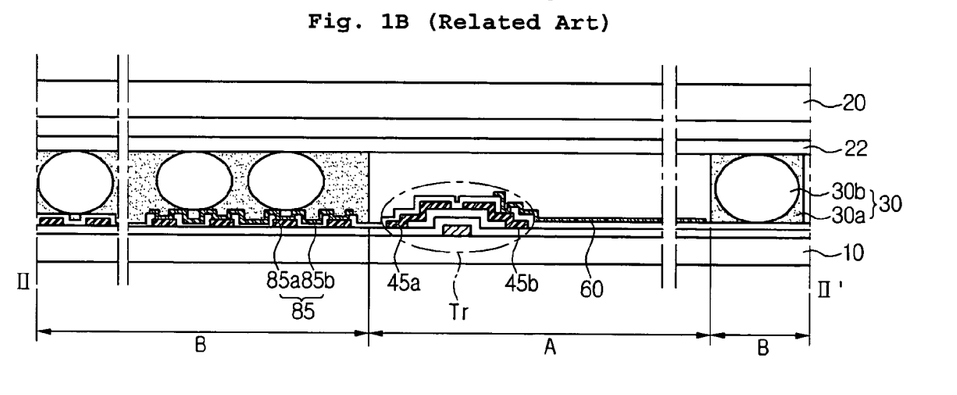

FIGS. 1A and 1B are views of an LCD using a related art conductive thread pattern. FIG. 1A is a plan view when a second substrate of I-I' portion is removed from the LCD. FIG. 1B is a sectional view taken along line II-II' of FIG. 1A.

Referring to FIGS. 1A and 1B, the related art LCD includes a first substrate 10 and a second substrate 20, which are defined by a display region A and a non-display region B. The first substrate 10 and the second substrate 20 are attached by a conductive thread pattern. A plurality of gate lines 40 and data lines 50 are crossing each other on the first substrate 10 corresponding to the display region A. Each crossing of the gate lines 40 and the data lines 50 includes at least one TFT, and a pixel electrode 60 electrically connected to the TFT.

A pad part is formed on the first substrate 100 corresponding to the non-display region B to connect to an external circuit. That is, at least two gate pad parts 70 are formed on one side of the first substrate 10. The gate pad part 70 includes a predetermined region to which the end of each gate line 40 is gathered. Moreover, at least two data pad parts 80 are formed on another side of the first substrate 10. The data pad part 60 includes a predetermined region to which the end of each data line is gathered. At this point, each of the pad parts is electrically connected to a printed circuit board (PCB) (not shown) through a tape automated bonding (TAB) 90.

On the other hand, a conductive part 85 is disposed between the data pad parts 80, and the conductive thread pattern 30 is disposed on the outside of the first substrate having the conductive part 85. The conductive pattern 30 includes sealant 30a and a conductive ball 30b. The conductive thread pattern 30 attaches the first substrate 10 to the second substrate 20. Additionally, the conductive thread pattern 30 connects the common electrode 22 in the second substrate 20, and the conductive part 85.

Thus, a common voltage is supplied from an external circuit to the conductive part 85. The common voltage applied to the conductive part 85 is supplied to the common electrode 22 through the conductive thread pattern 30.

The conductive part 85 includes a dummy pattern 85a and a dummy pattern contact part 85b. The dummy pattern 85a is simultaneously formed when source/drain electrodes 45a and 45b of the TFT, and the data line 50 are formed. The dummy pattern contact part 58b is simultaneously formed on the dummy pattern 85a when the pixel electrode is formed.

Since the dummy pattern 85a is simultaneously formed with the data line 50 and the source/drain electrodes 45a and 45b, there is no choice for selecting a conductive material of the dummy pattern 85a. That is, the dummy pattern 85a may be formed of a low resistance metal to minimize the loss of a common voltage supplied to the common electrode 22. However, when considering simplicity of processes, the dummy pattern 85a is formed of a conductive metal of the data line 50 and the source/drain electrodes 45a and 45b.

Additionally, when the dummy pattern 85a, the data line 50, and data pad 80 are formed on an identical layer, there is limitation in designing the dummy pattern 85a.

SUMMARY

An liquid crystal display (LCD) device includes first and second substrates defined by a display region and a non-display region, and spaced a predetermined interval apart from each other. The LCD further comprises a liquid crystal layer interposed between the first and second substrates, and a conductive part formed on at least one side of the first substrate corresponding to the non-display region. The conductive part has a first dummy pattern formed of metal identical to that of a gate line in the display region. The LCD then comprises a common electrode formed on the second substrate, and a conductive thread pattern that electrically connects the common electrode and the conductive part, and attaches the first and second substrates.

In another aspect of the present invention, an LCD includes a first substrate defined by a display region and a non-display region, a gate electrode disposed on the first substrate corresponding to the display region, and a dummy pattern disposed on the first substrate corresponding to the non-display region and formed on a layer identical to that of the gate electrode. The LCD further comprises a gate insulating layer formed on a surface of the first substrate that has the gate electrode and the first dummy pattern, source and drain electrodes formed spaced apart from each other on both sides of an active layer on the gate insulating layer corresponding to the gate electrode, and a pixel electrode electrically connected to the drain electrode.

In a further aspect of the present invention, an LCD includes a first substrate defined by a display region and a non-display region, a gate electrode disposed on the first substrate corresponding to the display region, and a dummy pattern disposed on the first substrate corresponding to the non-display region. The LCD further comprises a gate insulating layer formed on a surface of the first substrate that has the gate electrode and the first dummy pattern, source and drain electrodes formed spaced apart from each other on both sides of an active layer on the gate insulating layer corresponding to the gate electrode, a second dummy pattern disposed on the gate insulating layer corresponding to the non-display region, and a pixel electrode electrically connected to the drain electrode.

In still another aspect of the present invention, a method of manufacturing an LCD includes depositing a first conductive material on a first substrate, forming a gate electrode and a first dummy pattern through a patterning process on the first substrate, forming a gate insulating layer on a surface of the first substrate that includes the gate electrode and the first dummy pattern, and forming an active layer, and source and drain electrodes on the gate insulating layer. The method of manufacturing an LCD further comprises forming a protective layer on the surface of the first substrate that includes the active layer and the source and drain electrodes, forming first and second contact holes in the protective layer to expose the drain electrode and the first dummy pattern, and forming a pixel electrode connected to the drain electrode through the first contact hole.

In yet another aspect of the present invention, a method of manufacturing an LCD includes depositing a first conductive material on a first substrate, forming a gate electrode and a first dummy pattern through a patterning process on the first substrate, forming a gate insulating layer in a surface of the first substrate that includes the gate electrode and the first dummy pattern, and forming an active layer, source and drain electrodes, and a second dummy pattern on the gate insulating layer. The method of manufacturing an LCD further comprises forming a protective layer on the surface of the first substrate that includes the active layer, the source and drain electrodes, and the second dummy pattern, forming first and second contact holes in the protective layer to expose the drain electrode and the first dummy pattern, and forming a pixel electrode connected to the drain electrode through the first contact hole.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 2A:
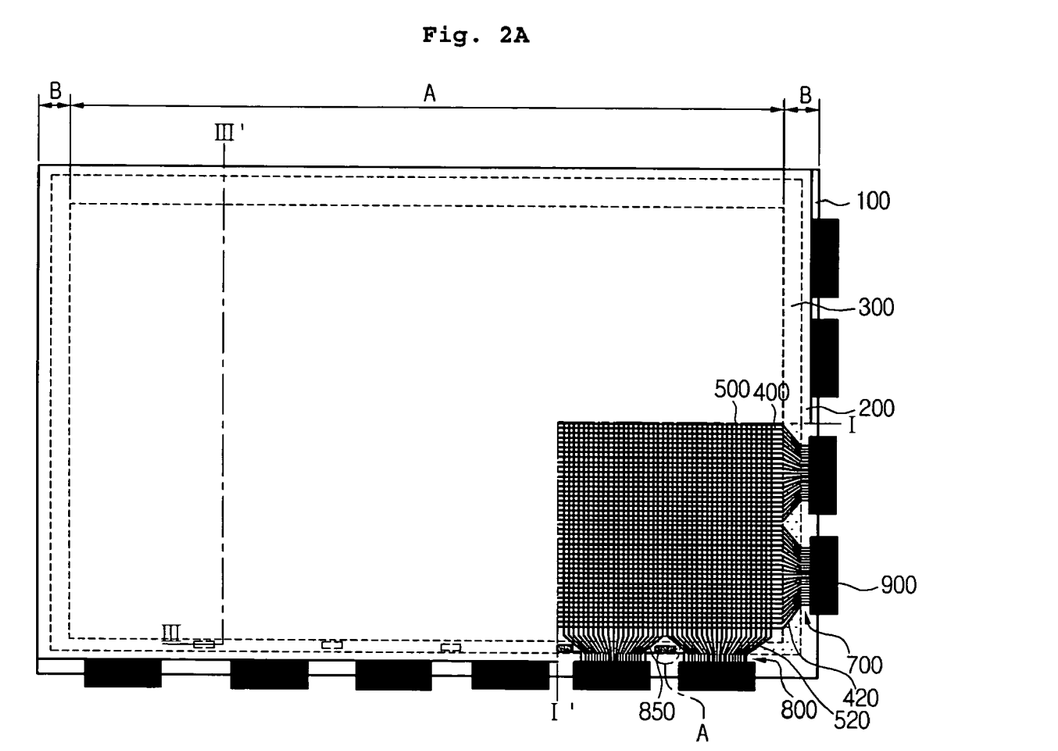
FIGS. 2A-2C are views of an LCD according to an embodiment of the present invention.
Figure 2B:
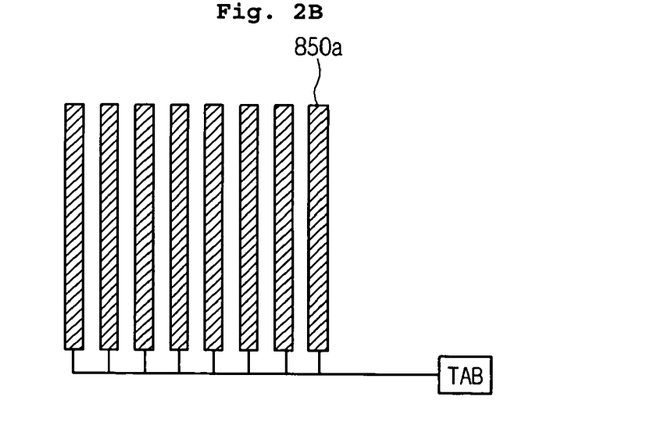
Figure 2C:
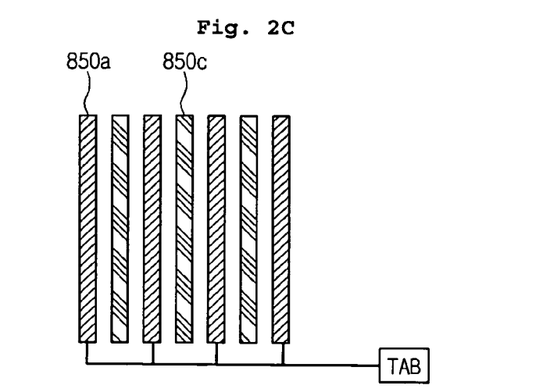

FIGS. 2A to 2C are views of an LCD according to an embodiment of the present invention. FIG. 2A is a plan view when I-I' portion of a second substrate is removed from the LCD. FIGS. 2B and 2C are views of a conductive part 850 of FIG. 2A.

Referring to FIG. 2A, the LCD is defined by a display region A and a non-display region B. The LCD includes first and second substrates 100 and 200 with a predetermined cell gap therebetween, and a liquid crystal layer (not shown) interposed between the first and second substrates 100 and 200.

A plurality of gate lines 400 and data lines 500 are crossed to define a plurality of unit pixels in the first substrate 100 corresponding to the display region A. Each of the unit pixels includes at least one thin film transistor (TFT), and a pixel electrode driven by the TFT. In one side of the first substrate 100 corresponding to the non-display region B, a gate pad part 700 is disposed on the ends of the gate lines 400 for connecting an external circuit part. In another side of the first substrate 100, a data pad part 800 is disposed on the ends of the data lines 500 for connecting the external circuit part. Here, each pad part is connected to the external circuit part through a tape automated bonding (TAB) 900 using a tape carrier package (TCP) with a driving IC. Additionally, the second substrate 200 includes a color filter layer for displaying colors in a region corresponding to each unit pixel, and a common electrode on the color filter layer.

The first and second substrates 100 and 200 are attached to each other through a conductive thread pattern 300 in the outside of the first and second substrates 100 and 200. The conductive thread pattern 300 attaches the first substrate 100 to the second substrates 200, and also electrically connects the first substrate 100 and a predetermined portion of the second substrate 200. The first substrate 100 includes a conductive part 850 disposed on a predetermined portion corresponding to the non-display region B. The conductive thread pattern 300 is formed on the conductive part 850. Thus, the conductive part 850 receives a common voltage applied from the outside, and supplies the common voltage to the common electrode of the second substrate 200 through the conductive thread pattern 300.

Referring to FIG. 2B, the conductive part 850 includes the data pad part 800 and a first dummy pattern 850a on and between the data pad parts 800. The first dummy pattern 850a may be formed of metal identical to that of the gate line 400 of FIG. 2A. Here, since the gate line 400 and gate electrode are generally formed of metal of a low resistance, the first dummy pattern 850a can be formed of metal of a low resistance. For example, the first dummy pattern 850a can be formed of at least one selected from the group comprising of Ta, Al, Ti, Ni, and AlNd.

Furthermore, referring to FIG. 2C, the conductive part 850 further includes the second dummy pattern 850c, which is alternately disposed with the first dummy pattern 850a. The second dummy pattern 850c is not directly connected to the conductive thread pattern 300 and serves to compensate an irregular cell gap generated from a step height between the dummy pattern 850a and the data pad part. Additionally, the second dummy pattern 850c may be formed of metal identical to that of the data line. Thus, a picture quality deterioration, which is generated by an irregular cell gap, can be reduced.

Referring to FIG. 2A, the conductive thread pattern 300 includes sealant and a conductive ball. The conductive ball can be formed of at least one selected from the group comprising of Ag, Au, Pb—Ag, and Pb—Sn. The conductive ball in the conductive thread pattern 300 serves to electrically connect the conductive part and the common electrode.

Therefore, when the conductive part 850 is formed of a low resistance metal identical to that of the gate line 400 and the gate electrode, a common voltage from the outside can be effectively supplied to the common electrode without loss.

The LCD of the present invention and a method of manufacturing the same will be described in more detail with reference to sectional views taken along line III-III' of FIG. 2A.

Figure 3:
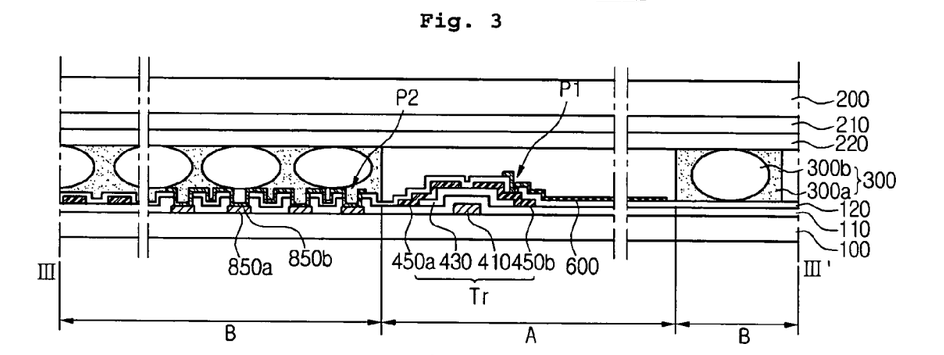
FIG. 3 is a sectional view taken along line III-III' of FIG. 2A.

FIG. 3 is a sectional view taken along line III-III' of FIG. 2A.

Referring to FIG. 3, a first substrate 100 is defined by a display region A and a non-display region B.

A plurality of gate lines 400 of FIG. 2A and gate electrodes 410 are disposed on the first substrate 100 corresponding to the display region A. An extension line 520 of the gate line is disposed on the first substrate 100 corresponding to the non-display region B. A dummy pattern 850a is disposed on a gate pad electrode (not shown) at the end of the gate line, and on another side having the gate pad electrode.

The first dummy pattern 850a may be formed of metal of a low resistance. For example, the first dummy pattern 850a can be formed of at least one selected from the group comprising of Ta, Al, Ti, Ni, and AlNd.

Since the gate electrode 410 is generally formed of a low resistance metal, the first dummy pattern 850a can be formed of a conductive material identical to that of the gate electrode 410. Thus, an additional process is unnecessary to form the first dummy pattern 850a.

A gate insulating layer 110 is disposed on the first substrate 100 having the gate electrode 410 and the first dummy pattern 850a.

An active layer 430 is formed on the gate insulating layer 110 corresponding to the gate electrode 410, and source/drain electrodes 450a and 450b are spaced apart from each other on both sides of the active layer 430. Additionally, an extension line 520 of the data line is disposed on the gate insulating layer 110 corresponding to the non-display region B. A data pad electrode (not shown) is disposed at the end of the extension line 520 of the data line.

A protective layer 120 is disposed on the gate insulating layer 110 having the source/drain electrodes 450a and 450b. The protective layer 120 includes a first contact hole P1 exposing a portion of the drain electrode 450b, and a second contact hole P2 exposing a portion of the first dummy pattern 850a.

A pixel electrode 600 is electrically connected to the drain electrode 450b through the fist contact hole P1, and a first dummy pattern contact part 850b is electrically connected to the first dummy pattern 850a through the second contact hole P2.

The pixel electrode 600 can be formed of a conductive material identical to that of the fist dummy pattern contact part 850b. Furthermore, the first dummy pattern contact part 850b can be formed of indium-tin oxide (ITO) or indium-zinc oxide (IZO). Here, the first dummy pattern contact part 850b can serve to prevent a corrosion of the first dummy pattern 850a.

A first alignment layer (not shown) for an initial alignment of liquid crystal is disposed on the protective layer 120 of the display region A having the pixel electrode 600.

On the other hand, a second substrate 200 is spaced a predetermined interval apart from the first substrate 100. The second substrate 200 includes a color filter layer 210 in a region corresponding to each unit pixel of the first substrate 100, and a common electrode 220 on the first substrate 100 having the color filter layer 210. The common electrode 220 may be formed of a transparent conductive material such as ITO and IZO.

Additionally, a conductive thread pattern 300 is disposed on the outside of the first substrate 100 and the second substrate 200. The conductive thread pattern 300 is disposed on the first dummy pattern 850a of the first substrate 100. The first dummy pattern 850a is electrically connected to the common electrode 220 through the conductive thread pattern 300. The conductive thread pattern 300 can include sealant 300a and a conductive ball 300b. The conductive ball 300b can be formed of at least one selected from the group comprising of Ag, Au, Pb—Ag, and Pb—Sn. Thus, the first dummy pattern 850a is electrically connected to the common electrode 220 through the conductive ball 300b in the conductive thread pattern 300.

Furthermore, the first dummy pattern 850a is formed on the data pad part and between the data pad parts. Since the first dummy pattern 850a is formed on the data pad part or a protective layer 120 on the extension line 520 of the data line, it does not contact the data pad part or the protective layer 120. The first dummy pattern 850a can be formed to be overlapped with the extension line 520 of the data line or the data pad part. Thus, when the first dummy pattern 850a is formed, it can be designed without considering the data pad part or the extension line 520 of the data line.

The protective layer 120 may be formed of an insulation layer of a low dielectric constant. This can prevent a parasite capacity generated from overlapping the first dummy pattern 850a with the data pad part or the extension line 520 of the data line.

When the first and second substrates 100 and 200 are conducted through the conductive ball 300b, the first dummy pattern 850a can be formed with a more enlarged size compared to a related art by forming the first dummy pattern 850a on a layer identical to that of the gate electrode 410 and the gate line. The first dummy pattern 850a supplies a common voltage to the second substrate 200. Additionally, the first dummy pattern 850a can be formed of a low resistance metal, and thus more efficiently supplies the common voltage to the common electrode 220.

FIGS. 4A to 4E are views taken along line III-III' of FIG. 2A to illustrate a method of manufacturing an LCD according to an embodiment of the present invention.

Figure 4A:
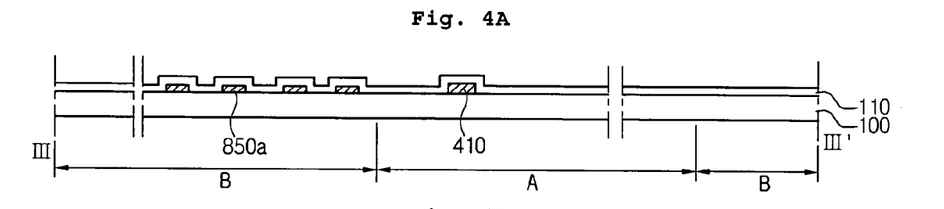
FIGS. 4A to 4E are views taken along line III-III' of FIG. 2A to illustrate a method of manufacturing an LCD according to an embodiment of the present invention.

Referring to FIG. 4A, a first substrate 100 is defined by a display region A and a non-display region B. Here, the first substrate 100 can be formed of glass or plastic.

A first conductive material is deposited on the first substrate 100. The first conductive material can be a low resistance metal. The first conductive material can be formed of at least one selected from the group comprising of Ta, Al, Ti, Ni, and AlNd.

Next, a plurality of gate lines and a gate electrode 410 protruded toward a direction different from that of the gate line are formed by patterning the first conductive material. Additionally, an extension line of the gate line, and a gate pad electrode and a first dummy pattern 850a disposed at the end of the extension line of the gate line are formed on a region corresponding to the non-display region B.

Next, a gate insulating layer 110 is formed on an entire surface of the first substrate 100 having the gate electrode 410 and the first dummy pattern 850a. The gate insulating layer 110 can be formed by depositing silicon nitride or silicon oxide through a chemical vapor deposition (CVD) process.

Figure 4B:
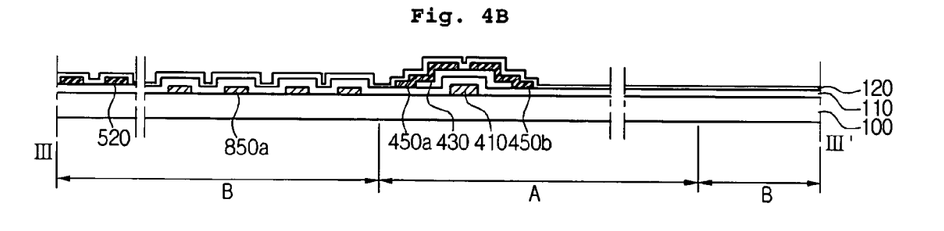

Referring to FIG. 4B, an amorphous silicon and an amorphous silicon doped with impurity are sequentially deposited on the gate insulating layer 110. Then, an active layer 430 is formed on a region corresponding to the gate electrode 410 by patterning the amorphous silicon layer and the amorphous silicon layer doped with impurity.

Next, a second conductive material is deposited on the gate insulating layer 110 having the active layer 430, and then patterned. Then, source/drain electrodes 450a and 450b are formed spaced apart from each other on the both sides of the active layer 430. Each data line is formed to be crossed with the gate line. At this point, a unit pixel is defined in the display region A through the gate line and the data line. On the other hand, an extension line 520 of the data line, and a data pad electrode at the end of the extension line 520 of the data line are formed on the gate insulating layer 110 corresponding to the non-display region B.

The active layer 430 and the source/drain electrodes 450a and 450b are formed using another mask process, but the present invention is not limited to this. Thus, the active layer 430 and the source/drain electrodes 450a and 450b can be formed using an identical mask process. An amorphous silicon layer and an amorphous silicon layer doped with impurity can be disposed on the bottom of the data line and the data pad electrode.

Next, a protective layer 120 is formed on the gate insulating layer 110 having the source/drain electrodes 450a and 450b. The protective layer 120 can be formed of silicon oxide or silicon nitride using a CVD process. The protective layer 120 may be formed of benzo-cyclo-butene (BCB) of a low dielectric constant. This allows the protective layer 120 to be interposed between the first dummy pattern 850a and the extension line 520 of the data line or the data pad part. When the first dummy pattern 850a is designed with a more enlarged size, the first dummy pattern 850a can be formed to be overlapped with the extension line 520 of the data line or the data pad part. However, since a parasite capacity can be generated in a region where the first dummy pattern 850a is overlapped with the extension line 520 of the data line or the data pad part, the protective layer 120 may be formed of an insulation layer of a low dielectric constant.

Figure 4C:
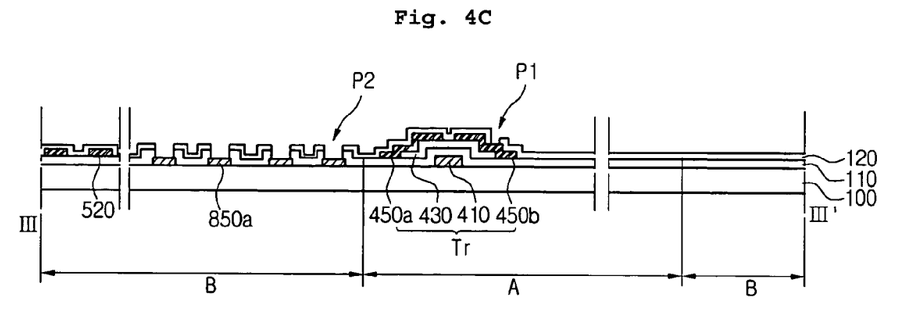

Referring to FIG. 4C, a first contact hole P1 is formed on the protective layer 120 to expose a portion of the drain electrode 450b. At this point, a second contact hole P2 may be simultaneously formed to expose a portion of the first dummy pattern 850a. The second contact hole P2 can be formed by etching the protective layer 120 and the gate insulating layer 100 collectively.

Figure 4D:
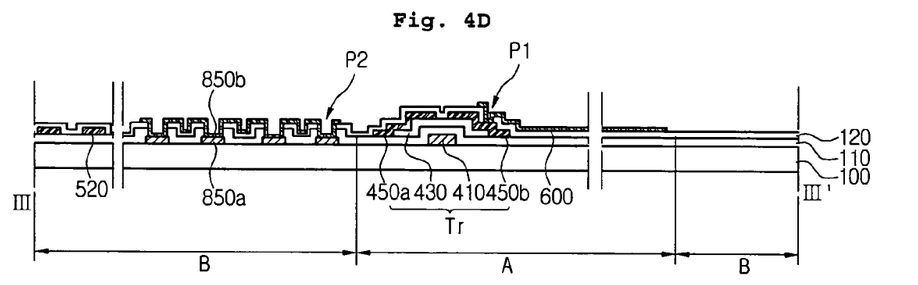

Referring to FIG. 4D, a transparent conductive material is deposited on the protective layer 120, and then patterned. Thus, a pixel electrode 600 connected electrically to the drain electrode 450b is formed through the first contact hole P1. The transparent conductive material can be ITO or IZO. On the other hand, the first dummy pattern contact part 850b is simultaneously formed, which is electrically connected to the first dummy pattern 850a exposed through the second contact hole P2. Since the outside of the first dummy pattern 850a can be prevented from corroding, reliability of the LCD can be achieved. A first alignment layer (not shown) can be further formed on the pixel electrode 600.

Figure 4E:
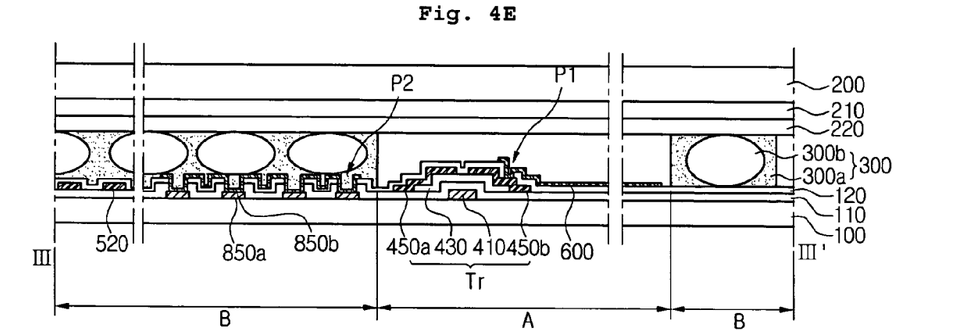

Referring to FIG. 4E, a conductive thread pattern 300 having sealant 300a and a conductive ball 300b is formed on the first substrate 100 having the first dummy pattern 850a. The conductive ball can be formed of at least one selected from the group comprising of Ag, Au, Pb—Ag, and Pb—Sn. Additionally, the conductive thread pattern 300 can be formed on a second substrate.

Next, the second substrate 200 is disposed on the first substrate 100. The first and second substrates 100 and 200 are coupled by pressure. Here, the second substrate 200 includes a color filter layer 210 and a common electrode 220 on a region corresponding to a unit pixel of the first substrate 100. Additionally, an alignment layer (not shown) can be further formed on the common electrode 220.

The first and second substrates 100 and 200 are coupled together through the conductive thread pattern 300. The first dummy pattern 850a of the first substrate 100 is electrically connected to the common electrode 220 of the second substrate 200.

Therefore, a common voltage supplied to the first dummy pattern 300 is supplied to the common electrode 220 through the conductive ball 300b of the conductive thread pattern 300.

Figure 5:
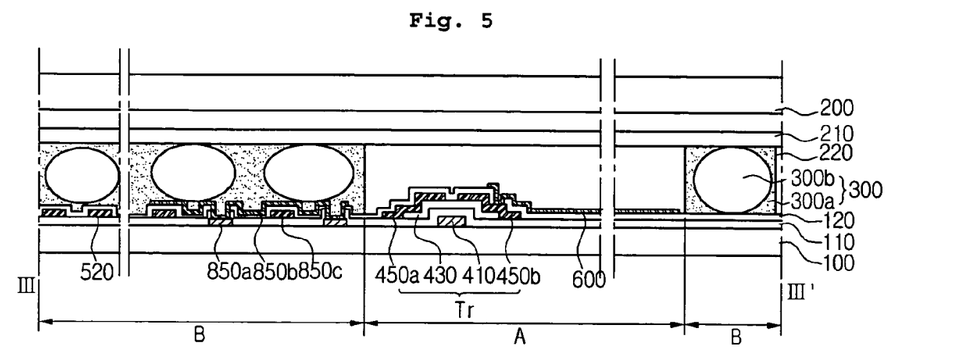
FIG. 5 is another sectional view taken along line III-III' of FIG. 2A.

FIG. 5 is another sectional view taken along line III-III' of FIG. 2A.

Here, except for adding a second dummy pattern 850c, like reference numerals in the drawings denote like elements.

Referring to FIG. 5, a first substrate 100 is defined by a display region A and a non-display region B. A plurality of gate lines and gate electrodes 410 are disposed on the first substrate 100 corresponding to the display region A. An extension line 520 of the gate line is disposed on the first substrate 100 corresponding to the non-display region B. A dummy pattern 850a is disposed on a gate pad electrode (not shown) at the end of the gate line, and on another side having the gate pad electrode. The first dummy pattern 850a may be formed of metal of a low resistance. For example, the first dummy pattern 850a can be formed of at least one selected from the group comprising of Ta, Al, Ti, Ni, and AlNd.

Since the gate electrode 410 is formed of a low resistance metal, the first dummy pattern 850a can be formed of a conductive material identical to that of the gate electrode 410. Thus, an additional process is unnecessary to form the first dummy pattern 850a.

A gate insulating layer 110 is disposed on the first substrate 100 having the gate electrode 410 and the first dummy pattern 850a.

An active layer 430 is formed on the gate insulating layer 110 corresponding to the gate electrode 410, and source/drain electrodes 450a and 450b are spaced apart from each other on both sides of the active layer 430. Additionally, a second dummy pattern 850c is disposed on the gate insulating layer 110 corresponding to the non-display region B.

The second dummy pattern 850c and the first dummy pattern 850a are disposed alternately. Since a step height between the first dummy pattern 850a and the extension line of the data line or the data pad part can be overcome, a picture quality deterioration, which is generated by an irregular cell gap, can be reduced.

A protective layer 120 is disposed on the gate insulating layer 110 having the source/drain electrodes 450a and 450b. The protective layer 120 includes a first contact hole P1 exposing a portion of the drain electrode 450b, and a second contact hole P2 exposing a portion of the first dummy pattern 850a.

A pixel electrode 600 is disposed and electrically connected to the drain electrode 450b through the fist contact hole P1. A first dummy pattern contact part 850b is disposed and electrically connected to the first dummy pattern 850a through the second contact hole P2. Here, the area where the first dummy pattern contact part 850b contacts a conductive thread pattern 300 increases through the second dummy pattern 850c. Thus, a common voltage can be easily supplied to a common electrode in the second substrate 200. Additionally, since the area contacting the conductive thresh pattern increases, an adhesive strength between the first substrate 100 and the second substrate 200 can be improved.

The pixel electrode 600 can be formed of a conductive material identical to that of the fist dummy pattern contact part 850b. Furthermore, the first dummy pattern contact part 850b can be formed of ITO or IZO. Here, the first dummy pattern contact part 850b can serve to reduce a corrosion of the first dummy pattern 850a.

A first alignment layer (not shown) for an initial alignment of liquid crystal is disposed on the protective layer 120 of the display region A having the pixel electrode 600.

On the other hand, a second substrate 200 is spaced a predetermined interval apart from the first substrate 100. The second substrate 200 includes a color filter layer 210 in a region corresponding to each unit pixel of the first substrate 100, and a common electrode 220 on the first substrate 100 having the color filter layer 210. The common electrode 200 may be formed of a transparent conductive material such as ITO and IZO.

Additionally, a conductive thread pattern 300 is disposed on the outside of the first substrate 100 and the second substrate 200. The conductive thread pattern 300 is disposed on the first dummy pattern 850a and the second dummy pattern 850b of the first substrate 100. The first dummy pattern 850a is electrically connected to the common electrode 220 through the conductive thread pattern 300. The conductive thread pattern 300 can include sealant 300a and a conductive ball 300b. The conductive ball 300b can be formed of at least one selected from the group comprising of Ag, Au, Pb—Ag, and Pb—Sn. Thus, the first dummy pattern 850a is electrically connected to the common electrode 220 through the conductive ball 300b in the conductive thread pattern 300. Additionally, the second dummy pattern 850c serves to overcome a step height between the extension line 520 of the data line or the data pad part, and also increase the area contacting the conductive thread pattern 300. Thus, an adhesive strength and a voltage mobility can be improved.

As described above, since the first dummy pattern 850a is formed on the data pad part, and between the data pad parts, it is formed on the protective layer 120 on the data pad part or the extension line 520 of the data line. Thus, when the first dummy pattern 850a is formed, it can be designed without considering the data pad part or the extension line 520 of the data line. Additionally, when the first and second substrates 100 and 200 are conducted through the conductive ball 300b, the first dummy pattern 850a is formed on a layer identical to that of the gate electrode 410. The first dummy pattern 850a is a conductive part for supplying a common voltage to the second substrate 200. Thus, the first dummy pattern 850a can be formed with a more enlarged size compared to a related art. Additionally, since the first dummy pattern 850a can be formed of a low resistance metal, a common voltage can be more efficiently supplied to the common electrode 220.

FIGS. 6A to 6E are views taken along line III-III' of FIG. 2A to illustrate another method of manufacturing an LCD according to an embodiment of the present invention. Except for the additional second dummy pattern 850c, like reference numerals in the drawings denote like elements.

Figure 6A:
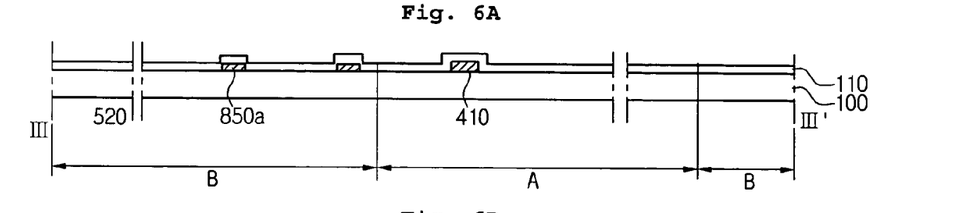
FIGS. 6A to 6E are views taken along line III-III' of FIG. 2A to illustrate another method of manufacturing an LCD according to an embodiment of the present invention.

Referring to FIG. 6A, a first substrate 100 is defined by a display region A and a non-display region B. Here, the first substrate 100 can be formed of glass or plastic.

A first conductive material is deposited on the first substrate 100. The first conductive material can be a low resistance metal. The first conductive material can be formed of at least one selected from the group comprising of Ta, Al, Ti, Ni, and AlNd.

Next, a plurality of gate lines, and a gate electrode 410 protruded toward a direction different from that of the gate line are formed by patterning the first conductive material. Additionally, an extension line of the gate line, and a gate pad electrode and a first dummy pattern 850a disposed on the end of the extension line of the gate line are formed on a region corresponding to the display region B.

Next, a gate insulating layer 110 is formed on an entire surface of the first substrate having the gate electrode 410 and the first dummy pattern 850a. The gate insulating layer 110 can be formed by depositing silicon nitride or silicon oxide through the CVD process.

Figure 6B:
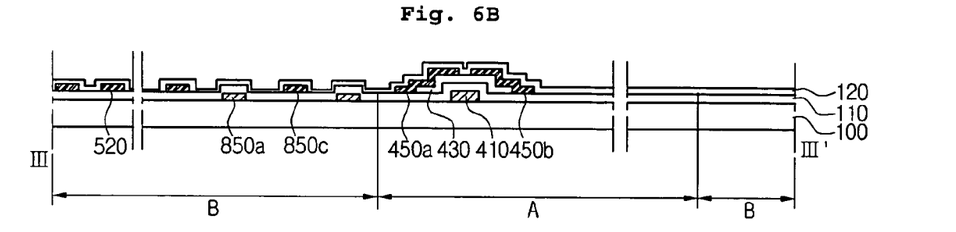

Referring to FIG. 6B, an amorphous silicon and an amorphous silicon doped with impurity are sequentially deposited on the gate insulating layer 110. Then, an active layer 430 is formed on a region corresponding to the gate electrode 410 by patterning the amorphous silicon layer and the amorphous silicon layer doped with impurity.

Next, a second conductive material is deposited on the gate insulating layer 110 having the active layer 430, and then patterned. Then, source/drain electrodes 450a and 450b are formed spaced apart from each other on the both sides of the active layer 430. Each data line is formed to be crossed with the gate line. At this point, a plurality of unit pixels is defined in the display region A by the gate lines and the data lines. On the other hand, an extension line 520 of the data line, and a data pad electrode and the second dummy pattern 850c at the end of the extension line 520 of the data line are formed on the gate insulating layer 110 corresponding to the non-display region B. At this point, the second dummy pattern 850c and the first dummy pattern 850a are formed to be disposed alternately.

Here, the active layer 430 and the source/drain electrodes 450a and 450b are formed using another mask process, but the present invention is not limited thereto. Thus, the active layer 430 and the source/drain electrodes 450a and 450b can be formed using an identical mask process. An amorphous silicon layer and an amorphous silicon layer doped with impurity can be disposed on the bottom of the data line and the data pad electrode.

Next, a protective layer 120 is formed on the gate insulating layer 110 having the source/drain electrodes 450a and 450b. The protective layer 120 can be formed of silicon oxide or silicon nitride using a CVD process. The protective layer 120 may be formed of benzo-cyclo-butene (BCB) of a low dielectric constant. A parasite capacity can be generated in a region where the first dummy pattern 850a is overlapped with the extension line 520 of the data line or the data pad part.

Figure 6C:
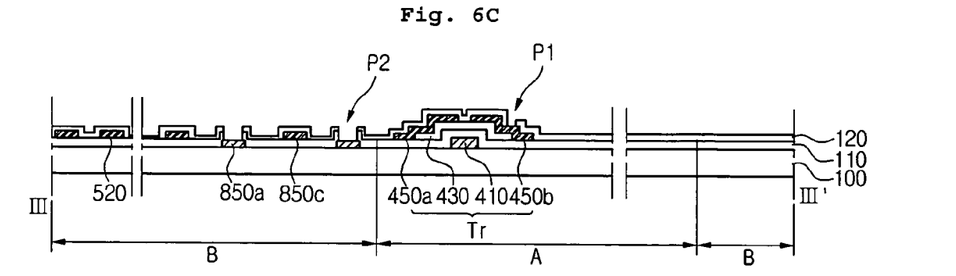

Referring to FIG. 6C, a first contact hole P1 is formed on the protective layer 120 to expose a portion of the drain electrode 450b. At this point, a second contact hole P2 may be simultaneously formed to expose a portion of the first dummy pattern 850a. The second contact hole P2 can be formed by etching the protective layer 120 and the gate insulating layer 110 collectively.

Figure 6D:
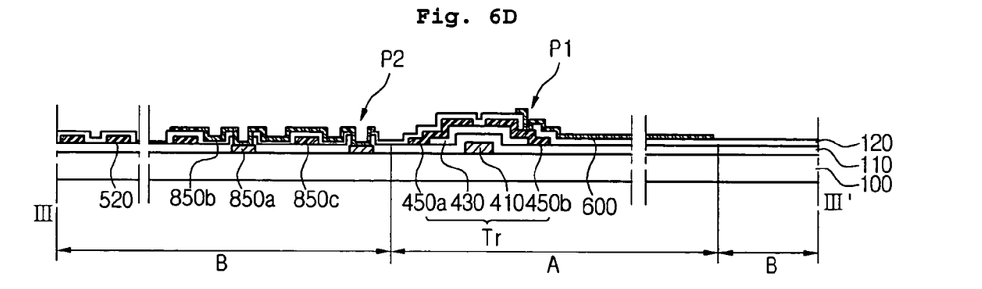

Referring to FIG. 6D, a transparent conductive material is deposited on the protective layer 120, and then patterned.

Thus, a pixel electrode 600 connected electrically to the drain electrode 450b is formed through the first contact hole P1. The transparent conductive material can be ITO or IZO. On the other hand, the first dummy pattern contact part 850b is simultaneously formed, which is electrically connected to the first dummy pattern 850a exposed through the second contact hole P2. Since the outside of the first dummy pattern 850a can be prevented from corroding, reliability of the LCD can be achieved. A first alignment layer (not shown) can be further formed on the pixel electrode 600.

Figure 6E:
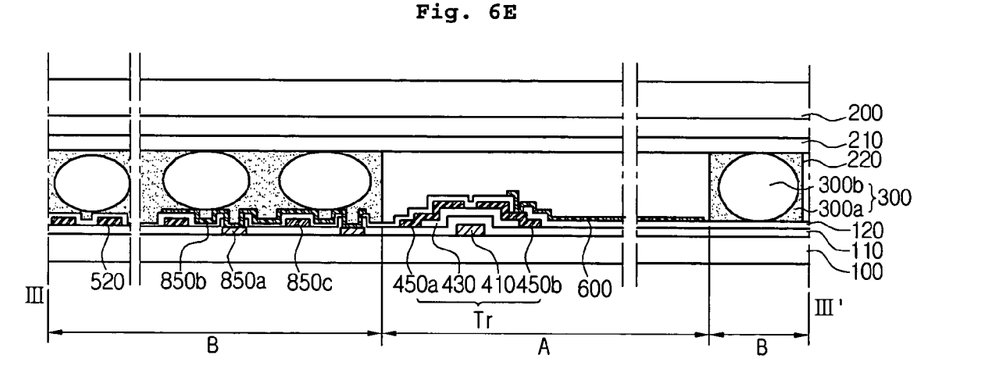

Referring to FIG. 6E, a conductive thread pattern 300 having sealant 300a and a conductive ball 300b is formed on the first substrate 100 having the first dummy pattern 850a. The conductive ball can be formed of at least one selected from the group comprising of Ag, Au, Pb—Ag, and Pb—Sn.

Next, the second substrate 200 is disposed on the first substrate 100. The first and second substrates 100 and 200 are coupled by pressure. Here, the second substrate includes a color filter layer 210 and a common electrode 220 on a region corresponding to a unit pixel of the first substrate 100. Additionally, a second alignment layer (not shown) can be further formed on the common electrode 220.

The first and second substrates 100 and 200 are coupled together by the conductive thread pattern 300. The first dummy pattern 850a of the first substrate 100 is electrically connected to the common electrode 220 of the second substrate 200.

Therefore, a common voltage supplied to the first dummy pattern 300 is supplied to the common electrode 220 through the conductive ball 300b of the conductive thread pattern 300.

According to the present invention, since the first substrate is conducted to the second substrate through the conductive thread pattern having a high-density conductive ball, the LCD with an improved conductivity can be manufactured.

Additionally, since the first dummy pattern, which is the conductive part of the first substrate, can be formed using a low resistance gate metal, a common voltage supplied from the external circuit part can be efficiently supplied to the common electrode of the second substrate.

Additionally, since the first dummy pattern, which is a conductive part of the first substrate, can be designed to be overlapped with the extension line of the data line or the data pad electrode, the design margin area of the first dummy pattern can be enlarged.

Moreover, since the first dummy pattern and the second dummy pattern are disposed alternately to overcome a step height between the first dummy pattern and the data pad, an irregular cell gap between the first and second substrates can be prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD comprising:
    a first substrate defined by a display region and a non-display region;
    a gate electrode disposed on the first substrate corresponding to the display region;
    a first dummy pattern disposed on the first substrate corresponding to the non-display region, wherein the first dummy pattern is formed on and between data pad parts connecting to an external circuit part;
    a gate insulating layer formed on a surface of the first substrate that includes the gate electrode and the first dummy pattern;
    source and drain electrodes formed spaced apart from each other on both sides of an active layer on the gate insulating layer corresponding to the gate electrode;
    a second dummy pattern disposed on the gate insulating layer corresponding to the non-display region, wherein the second dummy pattern and the first dummy pattern are formed alternately and apart from the each other;
    a pixel electrode electrically connected to the drain electrode;
    a conductive thread pattern formed on an outside region of the first substrate with the first dummy pattern; and
    a second substrate facing the first substrate and having a common electrode,
    wherein the first dummy pattern is connected to the common electrode through the conductive thread pattern.

2. The LCD according to claim 1, wherein the conductive pattern comprises a sealant and a conductive ball.

3. The LCD according to claim 2, wherein the conductive ball is formed of at least one selected from the group consisting of Ag, Au, Pb—Ag, and Pb—Sn.

4. The LCD according to claim 1, further comprising:
    a protective layer formed on the gate insulating layer that has the source and drain electrodes;
    first and second contact holes formed in the protective layer to expose the drain electrode and the first dummy pattern; and
    a first dummy pattern contact part electrically connected to the first dummy pattern through the second contact hole.

5. The LCD according to claim 4, wherein the first dummy pattern contact part is formed of a conductive material identical to that of the pixel electrode.

6. The LCD according to claim 4, wherein the first dummy pattern contact part is formed of ITO or IZO.

7. The LCD according to claim 1, wherein the first dummy pattern is formed of at least one selected from the group comprising of Ta, Al, Ti, Ni, and AlNd.

8. The LCD according to claim 1, wherein the first dummy pattern is formed of a metal identical to that of the gate electrode.

9. The LCD according to claim 1, wherein the second dummy pattern and the first dummy pattern are disposed alternately.

10. The LCD according to claim 1, wherein the second dummy pattern is formed of a metal identical to that of the source and drain electrodes.

11. A method of manufacturing an LCD, comprising:
    depositing a first conductive material on a first substrate;
    forming a gate electrode and a first dummy pattern through a patterning process on the first substrate, wherein the first dummy pattern is formed on and between data pad parts connecting to an external circuit part;
    forming a gate insulating layer in a surface of the first substrate that includes the gate electrode and the first dummy pattern;
    forming an active layer, source and drain electrodes, and a second dummy pattern on the gate insulating layer;
    forming a protective layer on the surface of the first substrate that includes the active layer, the source and drain electrodes, and the second dummy pattern;
    forming first and second contact holes in the protective layer to expose the drain electrode and the first dummy pattern;
    forming a pixel electrode connected to the drain electrode through the first contact hole;

forming a conductive thread pattern on an outside of the first substrate having the first dummy pattern; and attaching the first substrate and a second substrate, wherein the second substrate is spaced a predetermined interval apart from the first substrate, and has a common electrode, wherein the first dummy pattern is connected to the common electrode through the conductive thread pattern, wherein the first dummy pattern and the second dummy pattern are disposed alternately and apart from the each other.

12. The method according to claim 11, further comprising forming a first dummy pattern contact part electrically connected to the first pattern through the second contact hole during the forming of the pixel electrode.

13. The method according to claim 11, wherein the conductive thread pattern comprises a sealant and a conductive ball.

14. The method according to claim 13, wherein the conductive ball is formed of at least one selected from the group consisting of Ag, Au, Pb—Ag, and Pb—Sn.

15. The method according to claim 12, wherein the first dummy pattern contact part is formed of a conductive material identical to that of the pixel electrode.

16. The method according to claim 12, wherein the first dummy pattern contact part is formed of ITO or IZO.

17. The method according to claim 11, wherein the first dummy pattern is formed of at least one selected from the group consisting of Ta, Al, Ti, Ni, and AlNd.

18. The method according to claim 11, wherein the first dummy pattern is formed of a metal identical to that of the gate electrode.

19. The method according to claim 11, wherein the second dummy pattern is formed of a metal identical to that of the source and drain electrodes.

* * * * *